United States Patent
Schweikert et al.

(10) Patent No.: US 7,520,574 B2
(45) Date of Patent: Apr. 21, 2009

(54) PNEUMATIC EMERGENCY BRAKE RELEASE TIMER

(75) Inventors: David E. Schweikert, Duncan, SC (US); Robert N. Scharpf, Greer, SC (US); James A. Wood, Spartanburg, SC (US)

(73) Assignee: Wabtec Holding Corporation, Wilmerding, PA (US)

( * ) Notice: Subject to any disclaimer, the term of this patent is extended or adjusted under 35 U.S.C. 154(b) by 485 days.

(21) Appl. No.: 11/391,536

(22) Filed: Mar. 28, 2006

(65) Prior Publication Data

US 2007/0236077 A1    Oct. 11, 2007

(51) Int. Cl.
   *B60T 8/34*    (2006.01)
(52) U.S. Cl. ...................................... 303/128; 303/22.6
(58) Field of Classification Search ............... 303/3, 303/7, 15, 22.6, 127, 128
   See application file for complete search history.

(56) References Cited

U.S. PATENT DOCUMENTS

| | | | |
|---|---|---|---|
| 5,393,129 A | 2/1995 | Troiani et al. | |
| 5,730,504 A | 3/1998 | Gaughan | |
| 5,738,417 A | 4/1998 | Wood et al. | |
| 5,791,744 A * | 8/1998 | Wood et al. | 303/7 |
| 5,944,391 A | 8/1999 | Bezos | |
| 6,024,419 A | 2/2000 | Waldrop et al. | |
| 6,361,124 B1 | 3/2002 | Marra et al. | |
| 6,435,623 B1 | 8/2002 | Peltz | |
| 6,520,599 B2 | 2/2003 | Wood et al. | |
| 6,609,767 B2 | 8/2003 | Mortenson et al. | |
| 6,609,769 B2 | 8/2003 | Hart et al. | |
| 6,648,422 B2 | 11/2003 | Root et al. | |
| 6,932,437 B1 | 8/2005 | Root et al. | |
| 2002/0180264 A1 | 12/2002 | Moffitt | |
| 2004/0090111 A1 | 5/2004 | Root et al. | |

FOREIGN PATENT DOCUMENTS

| | | |
|---|---|---|
| EP | 0855319 A2 | 7/1998 |
| EP | 1437281 A1 | 7/2004 |
| GB | 754153 | 8/1956 |

* cited by examiner

*Primary Examiner*—Xuan Lan Nguyen
(74) *Attorney, Agent, or Firm*—The Webb Law Firm

(57) ABSTRACT

A pneumatic emergency brake release timer comprises a high capacity transfer valve, a timing reservoir in communication with the pilot port of the high capacity transfer valve, the check valve and choke circuit providing parallel connections between the main source of pressure and the reservoir through a check valve and opposite flow through a dissipating choke.

4 Claims, 2 Drawing Sheets

PNEUMATIC EMERGENCY BRAKE RELEASE TIMER

BACKGROUND OF THE INVENTION

1. Field of the Invention

This invention relates to pneumatic brakes for rail vehicles and, more particularly, to an emergency brake release timer for delaying the application of emergency braking pressures.

2. Description of Related Art

It is well known in the brake control art that modern train brake control systems typically use a central controller unit to control the brakes of the rail vehicles that comprise the train. A train operator located in the lead cab manipulates the brake handles or like devices of the train to apply and release the brakes of the trucks or bogies on each rail vehicle as desired. The inputs from the brake handles are typically processed by a cab control unit and passed to the central controller unit. In response to these and other inputs, the central controller unit issues a brake command signal along a train line to each of the rail vehicles in the form of either a pneumatic signal or an electrical signal or even both. Brake equipment on each of the rail vehicles applies or releases the brakes according to the dictates of the particular brake command signal received. The central controller unit sends the brake command signal to each of the rail vehicles along either a pneumatic train line or an electrical train line.

Depending on the type of train being considered, the brake equipment on each rail vehicle may include either exclusively pneumatic equipment or a combination of electrical and pneumatic (i.e., electro-pneumatic) equipment. In those trains featuring electro- pneumatic brake equipment on the rail vehicles, each rail vehicle typically includes a local control system whose construction and operation are generally well known in the brake control art. The local control system on each rail vehicle receives the brake command signal and various other signals in response to which it directly controls the electro-pneumatic equipment according to principles well known in the brake control art. Specifically, the local control system generates the electrical signals which open or close the various valves which supply pressure to or vent pressure from the brake cylinders. The brakes on each rail vehicle apply and release accordingly.

The prior art brake control systems discussed in the foregoing paragraphs typically provide service braking, emergency braking, dynamic brake blending, and wheel slip control functions. The local control system includes a microprocessor-based device which performs service brake control, limited emergency brake control, dynamic brake blending, and wheel slip control. Associated with the brakes on each bogie is a Brake Cylinder Control Unit (BCCU) which manipulates brake cylinder pressure based on pneumatic and/or electric inputs from the local control unit. It provides service and emergency brake cylinder pressure control as well as dynamic brake blending and wheel slip brake cylinder pressure modulation. The BCCU has integrated magnet valves and transducers which are monitored and controlled by the local control unit. The primary functional element of the BCCU is a Variable Load Relay Valve (VLRV) that provides a controlled pneumatic pressure to the brake cylinders. The output of the VLRV is a function of the pressure at its pilot pressure control port and an input indicative of vehicle load. The pilot pressure commands brake cylinder pressures during service braking. The pressures are related, for example, to speed and vehicle weight. In an emergency, the pilot pressure port of the VLRV is controlled for emergency stopping which may include modulation of brake cylinder pressure to minimize wheel slipping. Typically, the source of pilot pressure commands for service braking and emergency braking are different and are selected by an Emergency Magnet Valve (EMV) controlled by the local control system.

Typically during full emergency braking, modulation of the braking pressure by the VLRV or wheel slip control is inhibited. Inhibiting brake pressure modulation to wheel slip control often results in wheel slides and wheel lockups with extended stopping distances. With increasing demand for wheel protection in all brake modes along with increased emphasis on system safety, the pneumatic brake release timer according to this invention becomes necessary and easy to configure and analyze. The pneumatic brake release timer according to this invention will:

1. Provide a means to reduce the emergency brake level for a fixed limited period of time which begins at the start of the emergency condition and is not resetable.
2. Provide a non-electronic apparatus to return emergency brake pressure to the required level.
3. Allow for limited protection of the wheels in an emergency brake condition.
4. Allow limited duration software-controlled wheel slip control of emergency braking modes.
5. Provide a known reliability analysis of the emergency brake modes.

SUMMARY OF THE INVENTION

Briefly, according to this invention, there is provided an improvement in a pneumatic brake cylinder control circuit for controlling the supply of pressurized air to brake cylinders. The circuit has a main source of pressurized air (for example, a connection to a brake pipe) which drops in an emergency. A modulated source of pneumatic pressure is supplied to the brake cylinders during normal (service) braking. For example, a variable load relay valve supplies the brake cylinders with the appropriate braking pressure. The variable load relay valve is controlled by pilot pressure from either a service braking control source or an emergency braking control source selected by an emergency magnet valve.

The improvement, according to the present invention, comprises a pneumatic emergency brake release timer which includes a high capacity transfer valve connected in a first position to the output of the source of modulated pressure, for example, a variable load relay valve and in a second position to a source of emergency braking pneumatic pressure. The high capacity transfer valve is biased in the second position to provide communication between the modulated pressure source and the brake cylinders. The high capacity transfer valve is forced to the first position by pressure exceeding a preset pilot pressure at the pilot port of the high capacity transfer valve.

Pressure at the pilot port of the high capacity transfer valve is controlled by a release timer circuit comprising a timing reservoir and a check valve and choke circuit. The timing reservoir is in communication with the pilot port of the high capacity transfer valve and the check valve and choke circuit. The check valve and choke circuit has an input connected to the main source of compressed air (brake pipe). Thus, the output of the check valve and choke circuit is in communication with the timing reservoir and pilot port of the high capacity transfer valve. The check valve and choke circuit provides parallel connections between the input and the output such that flow from the brake pipe passes through a check valve and opposite flow passes through a dissipating choke. Thus, if due to an emergency, pressure in the brake pipe drops to atmospheric pressure, the pressure in the reservoir will slowly drop until it can no longer overcome the bias on the high capacity transfer valve.

According to a preferred embodiment, the preset pilot pressure and corresponding bias for the high capacity transfer valve and the volume of the timing reservoir are selected to provide a delay of at least seven seconds before the high capacity transfer valve connects the source of emergency braking air pressure to the brake cylinders.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
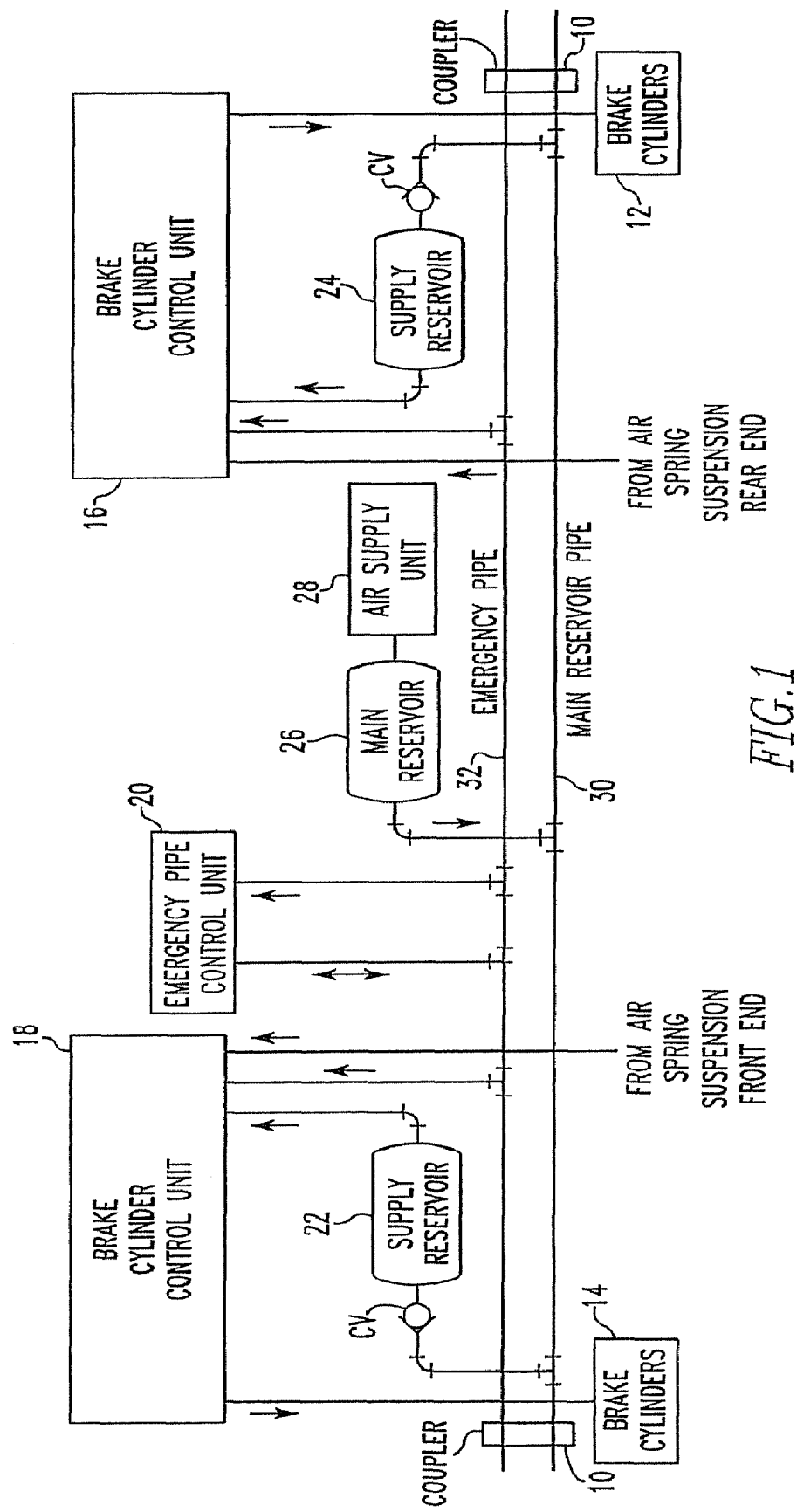
FIG. 1 is a much simplified schematic of an exemplary braking system on a transit vehicle in which the improvement of this invention can be implemented.

Referring now to FIG. 1, the transit vehicle has a coupler 10 at each end that mechanically couples adjacent vehicles and provides coupling of the emergency pipe 32 and main reservoir pipe 30 as well as electrical train lines. The main reservoir and emergency (brake) pipe are the source of pneumatic pressure for implementing service and emergency braking. The pipes, along with the electrical train lines, implement the combined electrical and pneumatic (electro-pneumatic) braking control.

As shown in FIG. 1, the transit vehicle has brake cylinders 12, 14 for each truck of the car for actuating brakes, such as disc or tread-type brakes, associated with each wheel axle. Each truck's brakes are controlled primarily by a Brake Cylinder Control Unit (BCCU) 16, 18. The BCCUs respond to service braking commands and emergency braking commands generated by local control systems, such as the Emergency Pipe Control Unit (EPCU) 20, friction brake control units, and train line control signals, which are known in the art. These components respond to electrical and pneumatic signals from both train line controls and local controls. The BCCUs are connected to local supply reservoirs 22, 24 which are charged by the main reservoir pipe 30. The output of the BCCUs is brake cylinder pressure which is transmitted to the brake cylinders. The emergency pipe pressure from the EPCU 20 is for emergency brake operations. The main reservoir pipe 30 is charged from the air supply unit 28, such as a compressor, and the main reservoir 26. The details described with reference to FIG. 1 are simply to provide the setting in which the wheel slip brake assurance modules described hereafter functions. These details form no essential part of the present invention.

Figure 2:
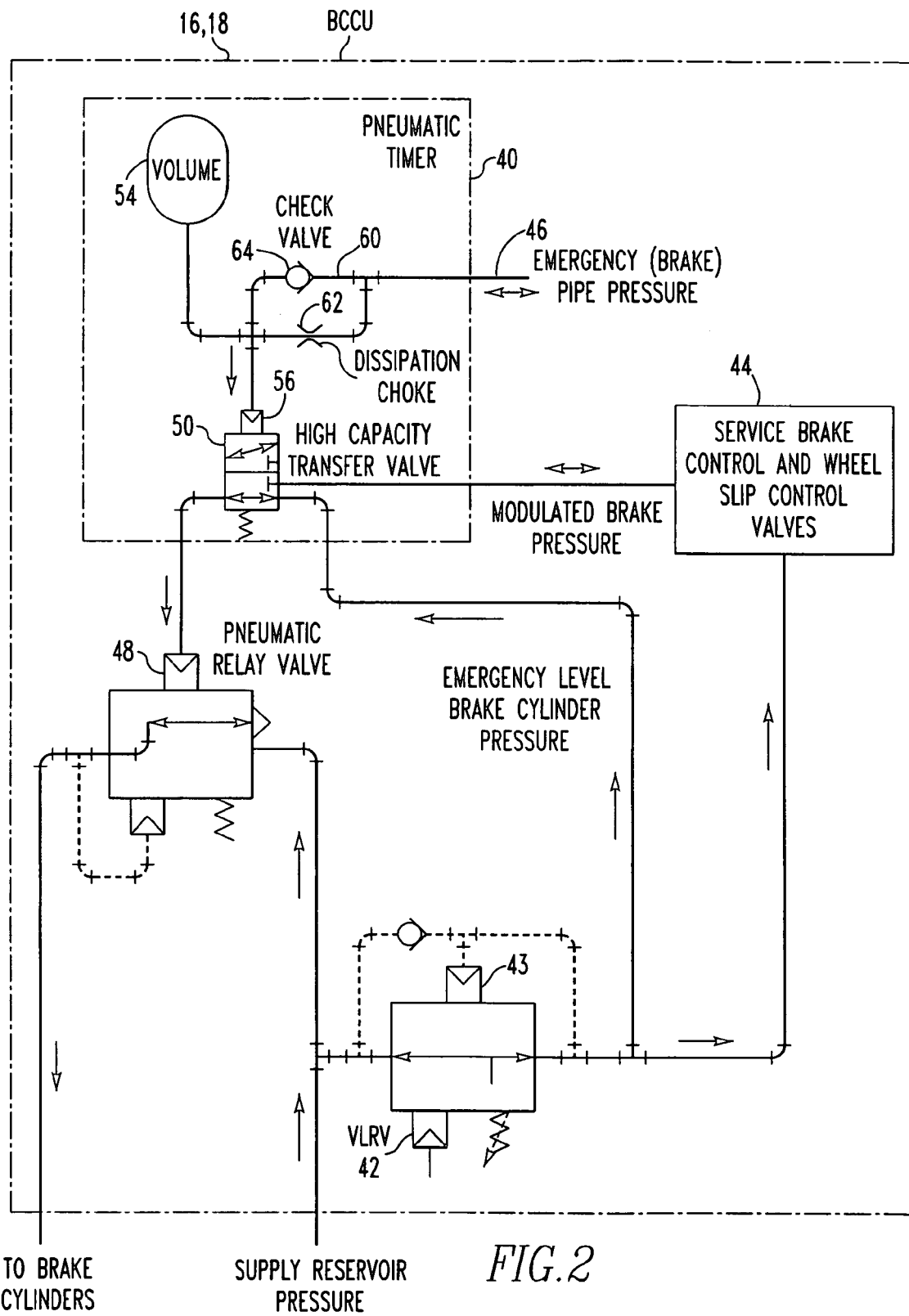
FIG. 2 is a schematic diagram of a brake cylinder control circuit in which a pneumatic emergency brake assurance module according to one embodiment of this invention has been implemented.

Referring now to FIG. 2, there is shown one example of a BCCU 16, 18 having a pneumatic release timer circuit 40. Central to the BCCU is the variable load relay valve (VLRV) 42 and pneumatic relay valve 48. The primary function of the BCCU is to provide electro-pneumatic friction service brake control, emergency brake control, dynamic brake blending, and wheel slip control for its respective bogie. The variable pressure output of the VLRV 42 is controlled by a pilot pressure at its pilot pressure port 43 and by a vehicle load input. The output of the VLRV 42 is connected to the service brake control and wheel slip valves unit 44 and to the High Capacity Transfer Valve (HCTV) 50 of the pneumatic timer 40. This pressure is an emergency brake level proportional to the truck loading. Under normal braking conditions, the brake cylinder pressure is controlled by the service brake control and wheel slip control valves. The output of this component is also connected to the HCTV 50 of the pneumatic timer.

The primary objective of this invention is to limit the time period in which modulation of the brake cylinder pressure is allowed after initiation of emergency braking. This invention is pneumatically implemented with components of known reliability and simple modes of operation. The use of a pneumatic timer circuit provides independence from electronic software-controlled pressure devices that are required to meet adaptive wheel slip control specifications. This invention ensures that emergency brake cylinder pressure is applied while allowing both dynamic brake blending and wheel slip control during the initial period of emergency braking. The time period in which the modulation of the available brake cylinder pressure is allowed after the initiation of emergency braking is controlled. Additionally, this circuit assures that emergency brake pressure is applied until emergency brake pipe pressure is restored.

A High Capacity Transfer Valve (HCTV) 50 determines whether the emergency brake output will come from the emergency level brake pressure (in some systems indirectly via an emergency unit) or the service brake control and wheel slip control valves 44. The HCTV 50 is biased in the position to provide emergency brake output from the emergency level brake pressure from the VLRV 42. The output of the HCTV 50 is connected to the pneumatic relay valve 48 which simply amplifies the flow of the brake pressure from the HCTV 50 output to the brake cylinders.

The emergency brake pipe 46 is connected to the input of the check valve and choke circuit 60. The outlet of the check valve and choke circuit 60 is connected to timing reservoir or volume 54 and the pilot port 56 of the HCTV 50. Thus, the timing reservoir will normally be filled to the pressure of the emergency brake pipe and the emergency brake pipe pressure being more than that needed to overcome the bias of the HCTV 50, the modulated brake control pressure from service brake control and slip control valves 44 will be in control of the brake cylinder pressure. In an emergency situation when the emergency brake pipe pressure is vented, the pressure in the reservoir 54 and on the pilot port 56 of the HCTV 50 will dissipate. This provides a timing or delay function that is dependent on the size of the dissipating choke 62, the volume of the timing reservoir 54, and the minimum pilot pressure to overcome the bias on the HCTV 50.

The check valve and choke circuit 60 are provided with two parallel paths. The dissipating choke 62 is in one path. In the other path is a check valve 64 permitting flow from the emergency brake pipe to the timing reservoir. The timing reservoir volume, dissipating choke size, and bias of the HCTV 50 are selected (configured) to meet the desired requirements based on the emergency brake analysis. These values are selected to limit the time before full emergency braking is enforced and to permit a period of wheel slip braking.

The pneumatic timer will begin timing out as soon as the emergency condition is initiated by the loss of emergency brake pipe pressure. The timer can be reset whenever emergency brake pressure is restored. The timer will time out after a period of time when the emergency condition is initiated.

As illustrated in FIG. 2, the modulated brake control pressure from service brake control and wheel slip control valves 44 and the emergency level brake pressure from the VLRV 42 are separate pressures. The emergency level brake pressure can be derived from an independent source (emergency unit) rather than the VLRV 42.

By way of example only, the ranges of certain parameters of the pneumatic brake assurance module are set forth in the following table.

TABLE

| Parameter | Maximum | Minimum |
|---|---|---|
| Brake Cylinder Pressure | 67 psi | 55 psi |
| Emergency Brake Pipe Pressure | 0 psi | 0 psi |
| Reservoir Volume | 90 in.$^3$ | 90 in.$^3$ |
| Dissipating Choke Size | 0.060 in. | 0.060 in. |
| Pilot Pressure to Overcome Bias on HCTV | 25 psi | 25 psi |

Having thus described our invention in the detail and particularity required by the Patent Laws, what is desired protected by Letters Patent is set forth in the following claims.

The invention claimed is:

1. In a pneumatic brake cylinder control circuit for controlling the supply of pressurized air to brake cylinders, said circuit having a main source of pressurized air which drops in an emergency and having a modulated pressure source, the output of which is supplied to the brake cylinders, the improvement comprising:
    a pneumatic emergency brake release timer comprising:
    a high capacity transfer valve connected in a first position to the output of the modulated pressure source and in a second position connected to a source of emergency braking air pressure, the high capacity transfer valve being biased in the second position to provide communication between the emergency braking air pressure and the brake cylinders, the high capacity transfer valve being forced to the first position by a preset pilot pressure at the pilot port;
    a timing reservoir in communication with the pilot port of the high capacity transfer valve; and
    a check valve and a choke circuit providing parallel connections between the main source of pressure and the timing reservoir through said check valve and opposite flow through a dissipating choke,
    whereby after a period of time for the timing reservoir to at least partially discharge through the choke circuit, the high capacity transfer valve will place the source of emergency braking air pressure in communication with the brake cylinders.

2. The improvement of claim 1, wherein the preset pilot pressure, a corresponding bias for the high capacity transfer valve and the volume of the timing reservoir are selected to provide a delay of at least seven seconds before the high capacity transfer valve connects the source of emergency braking air pressure to the brake cylinders.

3. In a pneumatic brake cylinder control circuit for controlling the supply of pressurized air to brake cylinders, said circuit having a main source of pressurized air which drops in an emergency and having a variable load relay valve, an output of which is supplied to the brake cylinders, said variable load relay valve being controlled by a first preset pilot pressure from either a service braking control source or an emergency braking control source selected by an emergency magnet valve, the improvement comprising:
    a pneumatic emergency brake release timer comprising:
    a high capacity transfer valve connected in a first position to the output of the variable load relay valve and in a second position connected to a source of emergency braking air pressure, the high capacity transfer valve being biased in the second position to provide communication between the emergency braking air pressure source and the brake cylinders, the high capacity transfer valve being forced to the first position by second preset pilot pressure at the pilot port;
    a timing reservoir in communication with the pilot port of the high capacity transfer valve; and
    a check valve and a choke circuit providing parallel connections between the main source of pressure and the timing reservoir through said check valve and opposite flow passes through a dissipating choke,
    whereby after a period of time for the timing reservoir to at least partially discharge through the said choke circuit, the high capacity transfer valve will place the source of emergency braking air pressure in communication with the brake cylinders.

4. The improvement of claim 3, wherein the second preset pilot pressure and a corresponding bias for the high capacity transfer valve and the volume of the timing reservoir are selected to provide a delay of at least seven seconds before the high capacity transfer valve connects the source of emergency braking air pressure to the brake cylinders.

* * * * *